United States Patent Office 2,769,806
Patented Nov. 6, 1956

2,769,806

DISAZO-DYESTUFFS

Oscar Weber, Reinach, Switzerland, assignor to Ciba Limited, Basel, Switzerland, a Swiss firm No Drawing. Application April 6, 1953, Serial No. 347,147

Claims priority, application Switzerland April 10, 1952

6 Claims. (Cl. 260—182)

This invention provides new disazo-dyestuffs which, like, for example, the dyestuff of the formula (1)
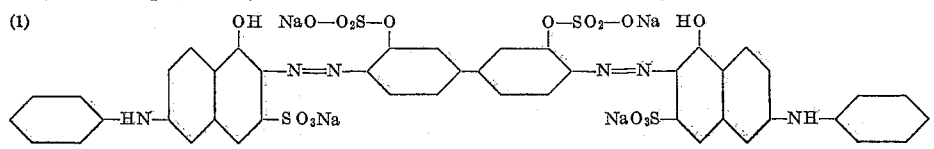

correspond to the general formula (2)
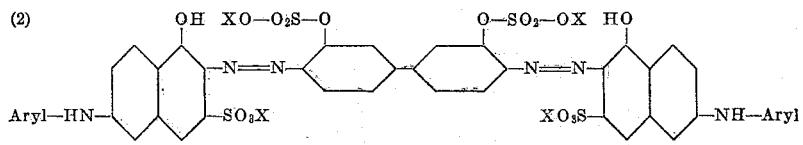

in which each X represents a cation.

These dyestuffs are made in accordance with the invention by treating 3:3'-dihydroxy-4:4'-diaminodiphenyl, on the one hand, to convert the two hydroxyl groups in the 3- and 3'-positions of the diphenyl radical into acid sulfuric acid ester groups and, on the other, to diazotize the two amino groups in the 4- and 4'-positions of the diphenyl radical and couple them with a 2-arylamino-5-hydroxynaphthalene-7-sulfonic acid, and carrying out the aforesaid treatments in either order of succession.

Thus, the dyestuffs of the formula (2) can be made either by coupling tetrazotized 3:3'-dihydroxy-4:4'-diaminodiphenyl disulfuric acid ester on both sides with a 2 arylamino-5-hydroxynaphthalene-7-sulfonic acid or by converting into sulfuric acid ester groups the hydroxyl groups in the 3- and 3'-positions of the diphenyl radical of a disazo-dyestuff obtained by coupling tetrazotized 3:3'-dihydroxy-4:4'-diamino-diphenyl on both sides with a 2-arylamino-5-hydroxynaphthalene-7-sulfonic acid.

The disulfuric acid esters used in the form of the process first mentioned in the preceding paragraph can be made by reacting 3:3'-dihydroxy-4:4'-diamino-diphenyl with chloro-sulfonic acid in an inert organic dispersing medium. As dispersing media there may be mentioned, for example, dioxane or halogenated hydrocarbons such as chlorobenzenes, carbon tetrachloride, chloroform or tetrachlorethane. Only a small excess of chlorosulfonic acid is required, for example, an excess of 10–20 percent. The reaction takes place with a gentle evolution of heat, and a reaction temperature slightly above room temperature, for example, about 40° C. to 60° C., is advantageous.

As the sulfuric acid esters so obtained are only slightly soluble in most dispersing media they can easily be separated from the reaction mixture by filtration. For the subsequent tetrazotization it is of advantage to convert the sulfuric acid ester into an alkali salt, for example, by reaction with an alkali carbonate, especially sodium carbonate, in the cold. If desired the sulfuric acid ester or its alkali salt may be dried.

The tetrazotization of the disulfuric acid ester is advantageously carried out at a low temperature. It is surprising that the diazo compound so obtained is so stable at low temperatures, that is to say, below 0° C., that coupling with 2-arylamino-5-hydroxynaphthalene-7-sulfonic acid can be carried out successfully without the aid of unusual precautionary measures. However, it is generally advisable either not to allow the tetrazotization mixture to become too strongly acid or to avoid a large excess of mineral acid. For this reason it is of advantage to carry out the tetrazotization with an alkali nitrite with the addition of a carboxylic acid such, for example, as acetic acid or benzoic acid. It is of course of advantage to use the diazo compound as soon as possible after its production.

The disulfuric acid esters are coupled with 2-arylamino-5-hydroxynaphthalene-7-sulfonic acids which may contain in the aryl radical further substituents, and advantageously those which do not impart solubility. As examples there may be mentioned 2-(2'-methylphenylamino)-, 2-(4'-methylphenylamino)-, 2-(4'-methoxyphenylamino)-, 2-(4'-chlorophenylamino)- and 2-phenylamino-5-hydroxy-naphthalene-7-sulfonic acid.

The coupling of tetrazotized 3:3'-dihydroxy-4:4'-diaminodiphenyl disulfuric acid ester with the 2-arylamino-5-hydroxynaphthalene-7-sulfonic acids may be carried out by the usual known methods, advantageously in an alkaline medium, for example, a medium rendered alkaline with an alkali carbonate, an alkali hydroxide or an alkaline earth metal hydroxide, and if desired, with the use of stable additions such as alcohols, acetone, pyridine, picolines or ethanolamines.

In making the dyestuffs in accordance with the second form of the process referred to above the tetrazotized 3:3'-dihydroxy-4:4'-diaminodiphenyl is first coupled on both sides with a 2-arylamino-5-hydroxynaphthalene-7-sulfonic acid, advantageously one of the azo components of this kind mentioned above, and then the hydroxyl groups in the 3- and 3'-positions of the diphenyl radical are converted into sulfuric acid ester groups. The coupling is advantageously carried out in a strongly alkaline medium, for example, a medium rendered alkaline with an alkali or alkaline earth metal hydroxide, and additions capable of assisting coupling may also be used such as pyridine, picolines, alcohol, acetone or ethanolamine.

The esterification of the two hydroxyl groups in the diphenyl radical of the dyestuffs so obtained is advantageously conducted in a tertiary base, for example, a pyridine base such as pyridine itself or a picoline at a moderately raised temperature. The dyestuff is advantageously recovered from the reaction mixture by distilling off the base in vacuo and neutralizing the radical with an alkali carbonate.

The dyestuffs obtained by the present process possess a good solubility in water in the form of their alkali salts, and can be used for dyeing or printing a very wide variety of materials, for example those of animal origin, such as leather, wool or silk, but especially cellulose-containing materials such as linen, cotton, or artificial silk or staple fibers of regenerated cellulose, and also artificial fibers of superpolyamides or superpolyurethanes.

The dyestuffs can be converted by known methods into complex metal compounds, for example, the complex iron, manganese, chromium, cobalt, nickel or copper compounds of the corresponding ortho:ortho'-dihydroxy-azo-dyestuffs. Conversion into the metal complexes may be carried out in known manner in substance or on the fiber or partially or wholly in the dyebath.

When the metal-free dyestuffs are used for dyeing cellulose-containing fibers, the dyestuffs are advantageously converted on the fiber, for example by known methods into the complex cobalt, nickel or advantageously copper compounds of the ortho:ortho'-dihydroxy-azo-dyestuffs. The dyeings may, for example, be treated with copper sulfate in a fresh bath. It is also of advantage to use the process of U. S. Patent No. 2,148,659, filed April 2, 1936 by Fritz Straub and Walter Anderau in which there are carried out in the same bath first dyeing and then the treatment with the agent yielding metal. As an agent yielding metal for this purpose there is advantageously used an agent yielding copper, and especially one which is stable towards alkaline solutions, such as a complex copper tartrate or sodium copper pyrophosphate.

Very valuable dyeings are also obtained by using the process in which a dyeing or printing produced with the metal-free dyestuff is after-treated with an aqueous solution which contains a basic formaldehyde condensation product of a compound which contains at least once the atomic grouping

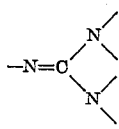

or a compound such as cyanamide which is easily convertible into a compound containing the aforesaid grouping, and also contains a water-soluble copper compound. Such a process is described, for example, in British Patent No. 619,969.

Cellulose-containing materials can be dyed with great advantage by the disazo-dyestuffs of the invention by using a neutral to alkaline dyebath which has been prepared with the aid of an amine, advantageously an aliphatic amine, which contains at least one hydroxyl group separated from the amino group by two carbon atoms, a phosphorus compound derived from a phosphoric acid, advantageously one having the constitution

in which $m$ represents a whole number, for example 2, an alkali-resistant compound of a metal having an atomic number from 27–29, advantageously a compound of this kind in which the metal forms the constituent of the aforesaid phosphorus compound, and a dyestuff of the formula (2). As agents yielding metal of the above kind there may be used advantageously an alkali copper pyrophosphate, and as the added amine 1:2-di-(β-hydroxyethylamino)-ethane is especially useful.

In carrying out the dyeing process described above there are used with advantage stable dyestuff preparations, which are characterized in that they contain an alkali copper pyrophosphate or polyphosphate and the dyestuff. In preparing the dyebath or a stock solution to be used for preparing the dyebath, it is only necessary to dissolve in water an amine of the kind described above, in addition to the preparation just described. In the case of solutions of high concentration, such as stock solutions, it is of advantage to avoid the addition of electrolytes such as sodium chloride or sodium sulfate.

In the methods of printing and dyeing hereinbefore described the formation of the ortho:ortho'-dihydroxy-azo-metal complexes on the fiber accompanied by the splitting off of the sulfuric acid ester groups takes place very easily, and there are obtained dyeings or prints which are distinguished by their good properties of fastness and the purity of their tints.

The following examples illustrate the invention, the parts and percentages being by weight:

*Example 1*

10.8 parts of 3:3'-dihydroxy-4:4'-diaminodiphenyl are stirred well in 50 parts of chloroform. 14.2 parts of chlorosulfonic acid are introduced dropwise into the resulting suspension in the course of 20 minutes at room temperature. After stirring the mixture for one hour at 50–60° C. it is filtered. The filter paste is then converted into the disodium salt by introducing it into a mixture of 60 parts of anhydrous sodium carbonate, 50 parts of water and 50 parts of ice. The disodium salt is filtered off with suction, and when dry it is a stable preparation. The disodium salt of the disulfuric acid ester is an almost colorless powder which dissolves in water without leaving any residue.

The paste obtained as described above is intimately mixed with 75 parts of ice, 80 parts of a saturated solution of sodium chloride and 6.9 parts of sodium nitrite. 32 parts of acetic acid of 85 percent strength are then poured in. The mixture is stirred for a short time at a temperature below 0° C. until the nitrous acid has disappeared.

31.5 parts of 2-phenylamino-5-hydroxynaphthalene-7-sulfonic acid are dissolved in 150 parts of water and 20 parts of sodium hydroxide solution of 30 percent strength, and reprecipitated by the addition of 105 parts of a calcium hydroxide suspension of 20 percent strength. The whole is then cooled with 60 parts of ice to 0° C. and the above described tetrazo-solution is added all at once. After being stirred for one hour, the mixture is acidified with hydrochloric acid, the dyestuff is filtered off with suction, and the paste so obtained is suspended in 500 parts of water. Sodium carbonate is added until the reaction is alkaline, and the product is salted out and filtered off. The dyestuff so obtained is a dark powder which dissolves in water, sodium carbonate and dilute sodium hydroxide solution with a blue coloration and in concentrated sulfuric acid with a blue green coloration. It corresponds to the formula

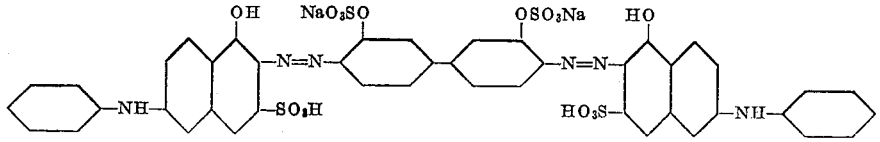

and dyes cotton by the single bath or 2-bath after-coppering process greenish blue tints having very good properties of wet fastness.

*Example 2*

65 parts of chlorosulfonic acid are added dropwise to 600 parts of pyridine, while the temperature is maintained at 20–30° C. by external cooling. There are then added in the course of 30 minutes 86.8 parts of the disazo-dyestuff obtained by coupling tetrazotized 3:3'-dihydroxy-4:4'-diaminodiphenyl with 2-phenylamino-5-hydroxynaphthalene-7-sulfonic acid, and the mixture is stirred for 5–6 hours at 60–65° C. The pyridine is distilled off in vacuo, and the oily residue is neutralized with sodium carbonate solution of 10 percent strength. The precipitated dyestuff is filtered off and dried. It has the same properties as the disazo-dyestuff obtained as described in Example 1.

By esterifying in the manner described above the disazo-dyestuffs from 1 mol of tetrazotized 3:3'-dihydroxy-4:4'-diaminodiphenyl and 2 mols of 2-(2'-methyl-phenyl-amino)-or of 2-(4'-methylphenylamino)- or of 2-(4'-chloro-phenylamino)- or of 2-(4'-methoxy-phenylamino) - 5 - hydroxynaphthalene - 7 - sulfonic acid, there are obtained products having similar properties and corresponding to the formulae dried. There is obtained a blue dyeing of good fastness to light and very good fastness to washing.

(b) 1.5 parts of complex sodium copper tartrate of approximately neutral reaction are added to the dyebath

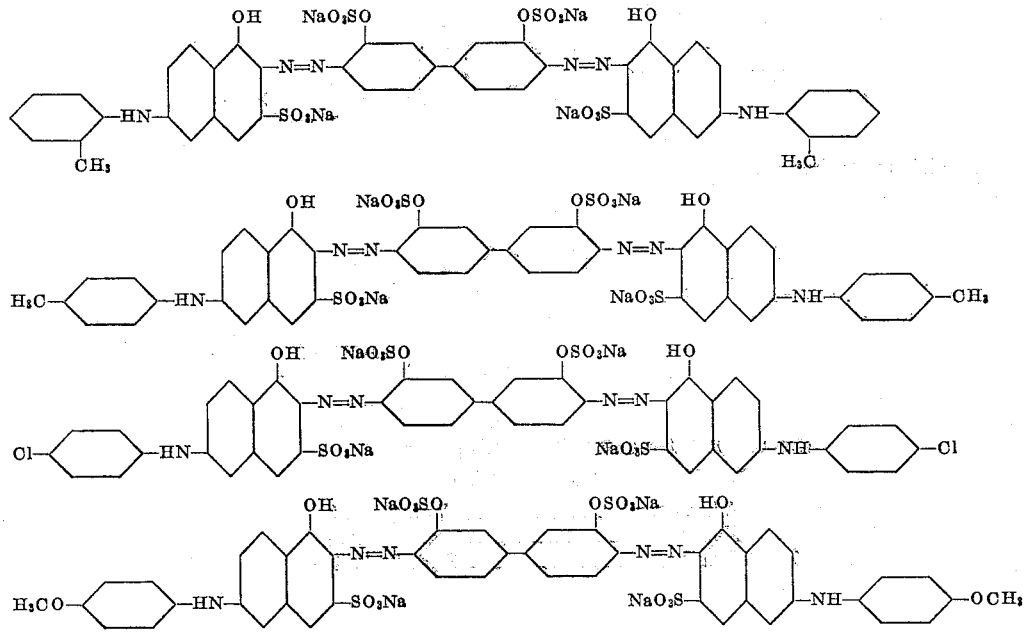

respectively

Example 3

100 parts of cotton are entered at 50° C. into a dyebath consisting of 4000 parts of water, 2 parts of anhydrous sodium carbonate and 0.3 part of the dyestuff obtained as described in the first, second and third paragraphs of Example 1, or in the first paragraph of Example 2. The temperature is raised to 90–95° C. in the course of 20 minutes, 30 parts of crystalline sodium sulfate are added, and dyeing is carried on for 30 minutes at 90–100° C. The bath is then allowed to cool to about 70° C. and the further treatment is as described below under (a) or (b).

(a) The dyeing is rinsed with cold water and treated for ½ hour at 60–70° C. in a bath which contains 4000 parts of water, 3 parts of crystalline copper sulfate and 3 parts of acetic acid. The material is then rinsed and cooled to about 70° C., coppering is carried on for ½ hour at about 80° C. and the dyeing is rinsed with cold water. If desired, the dyeing is soaped by after-treatment for ½ hour in a bath which contains 5 grams of Marseilles soap and 2 grams of anhydrous sodium carbonate per liter of water. There is obtained a blue dyeing of good fastness to light and very good fastness to washing.

I claim:

1. A disazo-dyestuff which in its free acid form corresponds to the formula

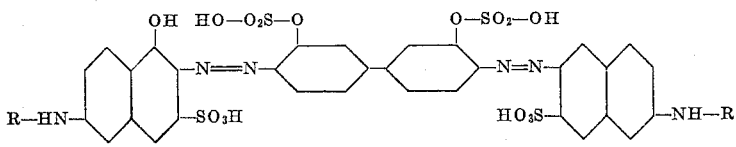

in which each R represents a radical of the benzene series free from groups imparting solubility.

2. A disazo-dyestuff which in its free acid form corresponds to the formula

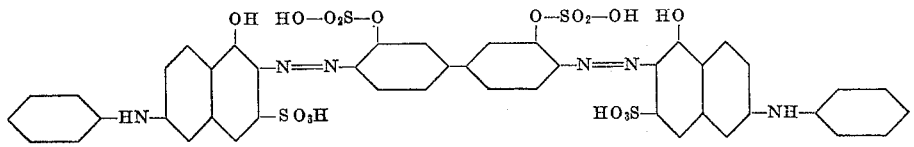

3. A disazo-dyestuff which in its free acid form corresponds to the formula

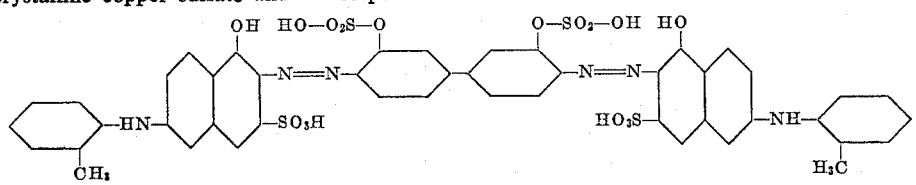

4. A disazo-dyestuff which in its free acid form corresponds to the formula

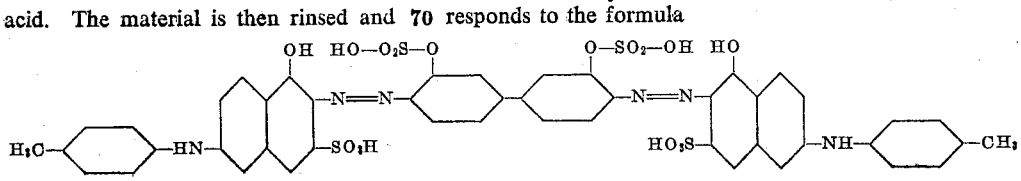

5. A disazo-dyestuff which in its free acid form corresponds to the formula
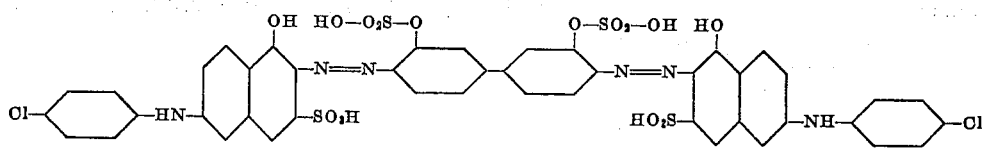
6. A disazo-dyestuff which in its free acid form corresponds to the formula
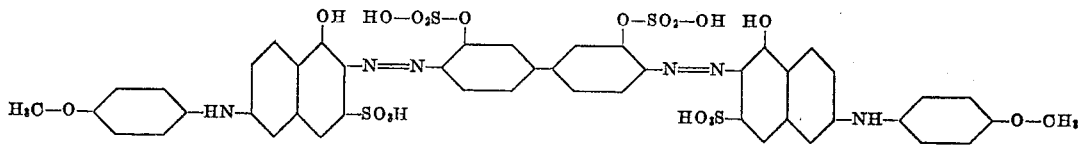
References Cited in the file of this patent
UNITED STATES PATENTS
| | | |
|---|---|---|
| 1,775,605 | Schweitzer | Sept. 9, 1930 |
| 2,211,752 | Kappeler | Aug. 20, 1940 |
| 2,426,977 | Straub et al. | Sept. 9, 1947 |